Jan. 26, 1965    R. G. WORMAN    3,167,600
PACKING MATERIAL

Filed Sept. 13, 1960    2 Sheets-Sheet 1

Inventor,
Robert G. Worman,
by Sidney Greenberg
His Attorney.

United States Patent Office 3,167,600
Patented Jan. 26, 1965

3,167,600
PACKING MATERIAL
Robert G. Worman, 1159 Harrelton Court,
Evansville, Ind.
Filed Sept. 13, 1960, Ser. No. 55,656
7 Claims. (Cl. 261—94)

The present invention relates to packing material, and more particularly concerns tower-packing material of the type used in gas and liquid contact apparatus.

Among the objects of the invention are to provide a packing of high efficiency of gas liquid contact together with high capacity, coupled with a uniform distribution of surface and void; to provide a packing with a maximum of available surface per unit mass of packing material; to provide a packing which can be loaded into and taken out of towers with ease while still being capable of assuming a closely-knit, mechanically stable packing within a tower; and to provide a packing which produces a minimum of channeling and sideward motion of the flow of liquids and gases passing therethrough.

Other objects and advantages will become apparent from the following description and appended claims.

With the above objects in view, the invention provides a tower-packing element comprising a strip-like member in the form of a single turn helix with the width of the strip-like member extending along the axis of the helix and with the ends of the member in contact with each other in axially overlapping relation. For optimum results in accordance with the invention, the ratio of the outside diameter of the helix to the width of the strip-like member is maintained within a predetermined range, as more fully disclosed hereinafter.

The invention will be understood from the following description taken in conjunction with the accompanying drawing, in which.

Figure 1:
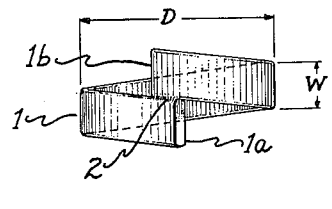
FIGURE 1 is a view in elevation of a packing unit or element provided in accordance with the invention.

In providing suitable tower-packing elements for achieving a practical gas-liquid contact process of optimum efficiency, there are a number of considerations which must be taken into account. One of these considerations is that of surface area. It is well known that in general a higher surface area per unit volume of packed bed results in higher efficiency, and this is because a higher surface area provides more area upon which exchange between the gas and liquid may take place. However, it is known that in general a higher surface area results in lower capacity, and this is because there is more obstruction to the passage downward of the liquid and the passage upward of the gas in the operation of the packed tower. It is also known that in general the aggregate surface area of any packing can be increased by making the unit pieces smaller. Further, it is well known that two different packings of the same surface area will not necessarily have the same capacities and efficiencies, because the performance of the packings depends on other characteristics as well as surface area, as will be seen from the discussion below.

Another characteristic of packing materials which significantly affects the performance of tower packing is the availability of the surface area. In a bed of packing the unit pieces are positioned with respect to one another in an infinite variety of ways, and it is apparent that portions of each unit piece will be more favorably situated to permit gas and liquid interchange than other portions of the same piece. For example, it is commonly accepted that in a bed of raschig rings, part of the surface inside many of the raschig rings will be less available for gas-liquid interchange than the external surface. It is also well known that raschig rings tend to align themselves in series or in parallel in ways which make the less available or "shadowed" surfaces even less available than would be the case if the positioning of the unit pieces were completely random.

Saddle packing elements, another known type of packing, differ from raschig rings in that they are of open form, but by its configuration a saddle tends to nest with, or overlap, or otherwise shadow portions of neighboring saddles. In many positions of orientation, saddles may tend to channel the flow of the liquids and gases and form a physical barrier between the liquid and gas approaching from opposite sides. A single turn helix is a closed form, but if its dimensions are properly related there is little or no shadowing of the inside surfaces. The helix has no plane of symmetry, as do the above-mentioned types of packing, and the positioning of individual pieces is completely random in a packed bed. Furthermore, with proper design, the tendency to form a physical barrier between opposing flows of liquid and gas may be minimized.

A further important consideration is that of the amount of void space within the packing. As will be evident, the lower the percentage of void volume within a unit volume of packed bed, the greater will be the hindrance to fluid flow and the lower the capacity of the bed. While a high void volume is desirable from the standpoint of increasing throughput rates and operating economies, a balance must be achieved between percent void and packing surface area, because if the void is increased at the expense of surface area, the packing will at some point begin to lose efficiency.

Another consideration, which is interrelated with the factors of surface area and percent void discussed above, is that of distribution of surface area and void. It will be apparent that for any given proportion of area and void there can be a wide range of distributions of the surface area in the void, and the distribution can have a substantial effect upon both the efficiency and capacity of the packing. At one extreme condition, for example, the surfaces might be grouped together with small clearances between the surfaces in each group, but with relatively large voids between separate groups. A tower packing with this type of distribution would show low pressure drops and high flooding velocities because the large voids would permit easy passage of liquids and gases. The efficiency, however, would be low if the surfaces within a group were too close together to permit free interchange between liquids and gases. At the other extreme would be the ideal condition where the distribution of void around each unit piece is uniform. While such distribution will result in higher pressure drop and lower flooding velocity, the efficiency will be relatively high because the gases and liquids have equal access to each unit of surface. Thus the distribution of surface area and void may make for large differences in performance between different packings with the same surface area, or the same void percent.

A further consideration in the design of packing pieces is the tendency of the packing to carry liquids and gases horizontally. In general, the wider and flatter the surfaces used within a given tower, the more horizontal component will be given to the flow of liquids and gases. With respect to liquid flow especially, a packing giving a high horizontal component to the flow will throw a relatively high proportion of liquid to the wall of the tower. The liquid may then drain down the tower wall, by-passing the packing and losing much of the interaction with the ascending gas.

There are other considerations in the design of packing materials which are extremely important, such as the mechanical strength of the unit pieces, the mechanical interlocking and stability of the pieces in aggregrate, and the settling characteristics. The importance of these factors will be apparent from the discussion below.

Single turn helices have been used in the past as packing elements, but the prior art units of this type have been subject to certain disadvantages. For one thing, the cut ends of the helices have not been substantially in contact nor overlapped, and this has resulted in massive interlocking of the packing due to the slipping of individual helices between the cut, separated ends of other helices. Such interlocking occurs through handling, vibration, and settling, not only in the handling of the helices during manufacture, but also during transportation and in the packing and operation of a tower, and it presents the problem of difficult separation and removal of the pieces when necessary. Also since the degree of interlocking of such pieces, and hence the area-percent void relationship, is due to chance and the degree of the forces producing the interlocking, it becomes impossible to produce a uniform degree of interlocking throughout a large bed. Nor is it possible to reproduce the same degree of interlocking from one packed bed to the next.

The prior art types of single turn helices, in addition to having the above disadvantages, have generally been made from wire or fiber members, essentially circular in cross section, with a relatively large diameter of helix with relation to the diameter of the wire or fiber. In fact, the prior art shows helices generally of a diameter 8 to 20 times the diameter of the wire or fiber member. Since the degree of interlocking cannot be adequately controlled, such helices may be insufficiently interlocked, which results in poor distribution of area and void, or interlocking may occur to excess, which may cause a lowering of the capacity of the bed below that desired. Also, with such larger diameter helices, the problem of breakage or distortion is increasingly encountered, since the form becomes less rigid as the diameter increases. Furthermore, the single turn helices of the prior art have been used primarily for laboratory equipment, and the application of such helices as packing in large towers of industrial size presents problems of scale-up. If such single turn helices made from members essentially circular in cross section are scaled up to meet the capacity requirements of a large tower, the packing becomes inordinately heavy and expensive.

The above difficulties are overcome by the single-turn helix packing units of my invention. The unit consists of a single-turn helix made of an elongated member of strip-shaped form with the cut ends substantially in contact with one another, and preferably fused, welded, cemented, or otherwise joined together so that interlocking is impossible.

As used herein, "helix" means an elongated member curved into a shape such as it would assume if wound in a single layer around a cylinder.

Figure 2:
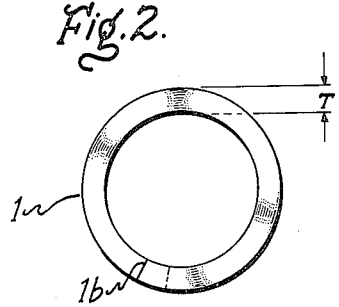
FIGURE 2 is a plan view of the FIGURE 1 element.

FIGURE 1 of the drawing shows an embodiment of the invention which comprises a strip 1 made, for example, of ceramic material, such as porcelain, vitreous material such as glass, plastics or synthetic resins, such as polyethylene and polyvinyl chloride, and metal, or any other suitable material, having a rectangular cross-section and formed in the shape of a single-turn helix with the ends 1a and 1b overlapping and placed substantially in contact with one another in overlap region 2. As more clearly shown in the plan view of FIG. 2, the overlapped ends are preferably aligned axially, i.e., have the same curvature as the rest of the piece, so that they will not project radially beyond the rest of the piece. If the overlapping ends are fused, cemented, or otherwise joined together the unit becomes a closed ring structure and the strength is greatly enhanced and the risk of breakage is lessened. As will be seen from the drawing, the strip-shaped member which has opposite longitudinally extending edges intersecting with laterally extending edges at its opposite ends is arranged so that the end portions of the opposite longitudinally extending edges are in contact with one another in axially superimposed relation.

In accordance with a particular feature of my invention, the outside diameter D of the helix is not more than about 4 times, and is not substantially less than, the width W of the strip which forms the helix, as indicated in FIGURE 1. In other words, the ratio of the dimension D to dimension W is within the range of 4:1 to 1:1. I have found that helices conforming to this relationship provide the optimum balance between surface area and percent void, are considerably less subject to breakage, can be packed reproducibly to a given surface area and void volume, have little tendency to carry liquid horizontally, either individually or in aggregate, and provide other notable advantages.

Figure 3:
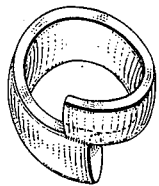
FIGURE 3 is a perspective view of another embodiment of the invention.
Figure 4:
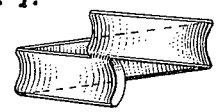
FIGURES 4, 5, 6, 7 and 8 illustrate still other embodiments of the packing elements of the invention; and, FIGURE 9 is an elevational view of a packed tower containing packing units of the present invention.
Figure 5:
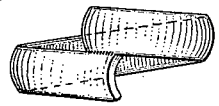
Figure 6:
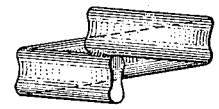

The strip-shaped member of which the helix is formed may be of a variety of cross-sectional shapes. Thus FIGURE 3 shows a member having an elliptical form, while FIGURES 4, 5, and 6 show, respectively, outwardly concave, inwardly concave, and double concave forms. The strip member may have shapes other than as shown, provided that the axially extending width (W) is somewhat greater than the thickness (T). As used herein, the "axial" dimension of strip 1 refers to the dimension W, and the "radial" dimension refers to the dimension T.

Figure 7:
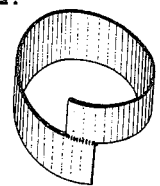

FIGURE 7 shows another embodiment of the invention wherein the strip, preferably made of metal, has a relatively small thickness (T) as opposed to the width (W). In this form a very high degree of void volume is obtained, as well as adequate surface area, and the thickness of the strip when made of metal can be made much less than in the case of ceramic materials without much risk of breakage.

Figure 8:
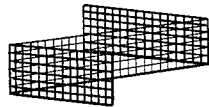

FIGURE 8 shows another embodiment of the invention, wherein the strip is in the form of a wire mesh material, preferably of metal. In this form a very high degree of surface area is available.

Figure 9:
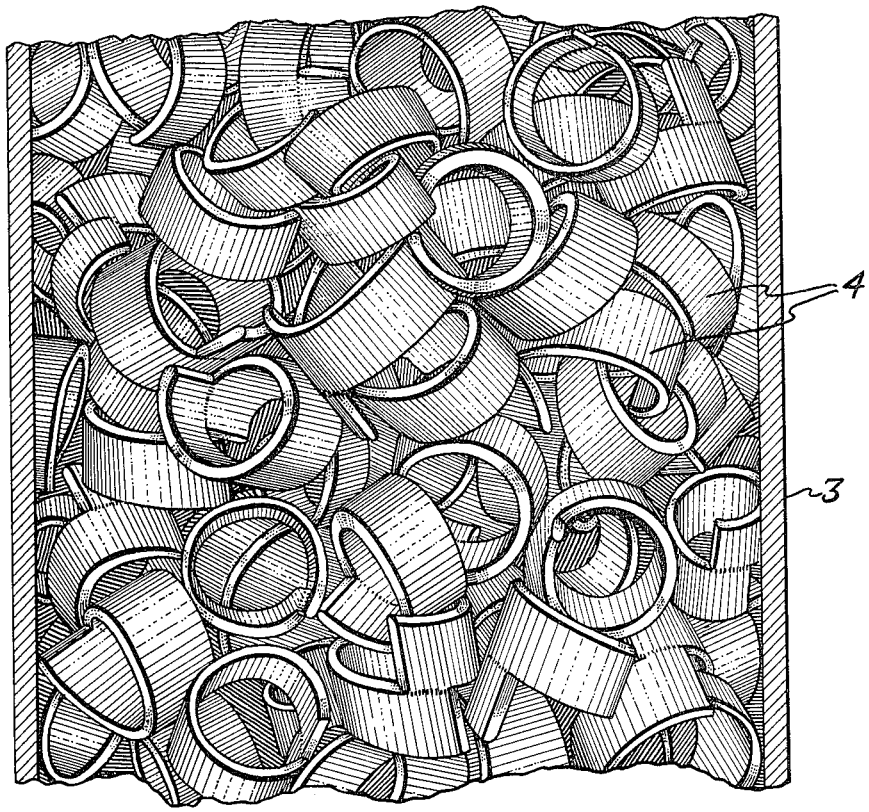

FIGURE 9 is a view of a packed tower 3 containing the packing units 4 having a form in accordance with the invention, and shows the typical distribution of such units when in the tower. As will be seen, the units are in random arrangement with no interlocking present and little or no shadowing of inside surfaces, and having a relatively uniform distribution of voids with respect to surface area.

Table I below shows a typical range of surface areas of packing which is made available by forming single turn helices from strip members, as in the present invention. In the table, D is the outside diameter of the individual helices in inches, W is the width of the strip in inches, A is the corresponding surface area of the material in square feet per cubic foot of packing, and percent V is the percent void of the packing, the thickness T being $\frac{1}{32}$ inch in all cases:

*Table I*

| D, in. | W, in. | D/W | A, ft.² | Percent V |
|---|---|---|---|---|
| ½ | ¼ | 2 | 97 | 90 |
| ¾ | ¼ | 3 | 76 | 93 |
| 1 | ¼ | 4 | 65 | 94 |
| ½ | ½ | 1 | 86 | 91 |
| ¾ | ½ | 1.5 | 72 | 93 |
| 1 | ½ | 2 | 58 | 95 |
| 1¾ | ½ | 3.5 | 40 | 98 |
| ¾ | ¾ | 1 | 68 | 94 |
| 1 | ¾ | 1.3 | 56 | 96 |
| 1¾ | ¾ | 2.3 | 38 | 98 |

It is apparent, therefore, that in the absence of interlocking the surface area of a packing made from a given strip may be varied widely by proper selection of the helix diameter within the range of proportions $D/W=1$ to $D/W=4$ in accordance with my invention.

Helices formed from strips produce a relatively high percentage of void volume as shown in Table I above. In contrast, helices formed of round rods or wires of corresponding width W produce packings with adequate surface area but low void volume, as shown in Table II below:

*Table II*

| D, in. | W, in. | D/W | A, ft.² | Percent V |
|---|---|---|---|---|
| 1 | ¼ | 4 | 71 | 61 |
| 1½ | ¼ | 6 | 58 | 73 |

Since the pressure drop through a packed bed varies roughly as the square of the gas mass velocity, relatively small changes in the percent void can result in relatively large changes in pressure drop, and the difference in percent void shown in the above table represents a large difference in pressure drop, flooding velocities, and operating economics for the two packings shown. It has been found, in general, that it is not possible to satisfy existing commercial requirements for high area and high percent void if an essentially round or square rod is used. I have found, however, that using a strip-shaped unit will result in a packing having adequately high surface area coupled with high void volume.

If the materials of which the helices are made is metallic or of other durable composition, the cross-sectional dimension ratio may be quite high, as for example 10:1 or 20:1. With material of less strength, such as ceramics, the ratio is correspondingly less, with a preferred minimum ratio of 2:1, that is, the axial width should be at least twice as great as the thickness of the strip. It will be obvious that a wide variety of cross sectional shapes may be used in meeting these requirements, as indicated by the various embodiments shown in the drawing. Also a great number of combinations of surface area, void percent area-void distribution, and mechanical strengths is obtainable by proper selection of the cross-sectional shape of the strip member from which the helices are formed. For example, Table III below illustrates the differences between helices of elliptical cross section and helices of the same overall dimensions but with cross section in the shape of a rhombus. In each case the unit helix has a diameter D of 1¼ inch, a width W of ½ inch, and a thickness T of ¼ inch.

*Table III*

| X-Section | No. Pieces per cu. ft. | A | Percent V |
|---|---|---|---|
| Ellipse | 2,016 | 57 | 72 |
| Rhombus | 2,304 | 61 | 75 |

The unit piece of rhombic cross-section has about 94% of the surface area of the unit piece of elliptic cross-section, but occupies only about 65% of the volume. The effect of the rhombic shape is to allow roughly 10% more pieces to occupy the same volume of packed bed, so that even though the area of the unit piece is lower, the surface area in aggregate is raised about 7%. At the same time, the percent void is increased by about 4%, which theoretically decreases the pressure drop of gas flowing through an unirrigated packed bed by about 20%.

Within the range of helix proportions covered by the present invention a wide range of performance characteristics is available. When $D/W$ is 1 or close to 1, the helices present the most uniform distribution of surface area and void, and hence the most efficient packing. Pressure drops will be relatively high, however, and the capacity relatively low. When $D/W$ is 4 or close to 4, the helices present a somewhat less uniform distribution of surface area and void, and the efficiency will be lower but the capacity higher. Even when $D/W$ is 4, however, the distribution of area and void is more uniform and more reproducible than that obtainable by the interlocking of helices as practiced in the prior art. Thus by the proper selection of helix proportions within the range covered by the present invention, a variety of packing characteristics can be obtained with more precision than theretofore possible.

There is thus provided by the invention tower packing elements which have numerous advantages over other forms of packing material. The closed strip-shaped helices of the invention have greater availability of surface area, greater mechanical strength, provide more uniform distribution of surface area and void, and produce packings of greater mechanical stability with less tendency to channel or throw horizontally the liquids and gases passed into the packed tower.

While in general it is preferred to have the overlapped ends of the helix in actual contact or even joined together, it will be understood that the invention includes within its scope an arrangement wherein the overlapped ends are slightly spaced, the spacing being small enough to prevent any interlocking of pieces. The expression "substantially in contact" used in the claims is intended to include elements with such spacing.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A tower packing element comprising a strip-shaped elongated member having opposite longitudinally extending edges intersecting with laterally extending edges at its opposite ends and arranged in the form of a substantially single turn helix with only the end portions of the opposite longitudinally extending edges substantially in contact with each other in axially superimposed and aligned overlapping relation, the width of the strip-shaped member being at least twice as great as the thickness thereof, the ratio of the outside diameter of the helix to the width of the strip-shaped member being from 1:1 to 4:1.

2. A tower packing element as defined in claim 1, wherein the element is composed of a ceramic material.

3. A tower packing element as defined in claim 1, wherein the element is composed of metal.

4. A tower packing element as defined in claim 1, wherein the element is composed of metal and is in the form of wire mesh.

5. A tower packing element as defined in claim 1, wherein the element is composed of a synthetic resin.

6. A tower packing element as defined in claim 1 wherein the element is composed of a vitreous material.

7. A liquid-gas contact apparatus comprising a tower having openings at top and bottom and containing therein a mass of randomly arranged tower packing elements, said elements each comprising a strip-shaped elongated member having opposite longitudinally extending edges intersecting with laterally extending edges at its opposite ends and arranged in the form of a substantially single turn helix with only the end portions of the opposite longitudinally extending edges substantially in contact with each other in axially superimposed and aligned overlapping relation, the width of the strip-shaped member being at least twice as great as the thickness thereof, the ratio of the outside diameter of the helix to the width of the strip-shaped member being from 1:1 to 4:1.

References Cited by the Examiner

UNITED STATES PATENTS

| | | |
|---|---|---|
| 2,921,776 | 1/60 | Keeping. |
| 3,039,749 | 6/62 | Kohl et al. _ _ _ _ _ _ _ _ _ _ _ _ 261—112 |

FOREIGN PATENTS

| | | |
|---|---|---|
| 576,613 | 5/24 | France. |
| 297,379 | 2/16 | Germany. |
| 449,935 | 5/23 | Germany. |
| 508,062 | 9/30 | Germany. |
| 104,163 | 10/17 | Great Britain. |
| 475,879 | 11/37 | Great Britain. |

HARRY B. THORNTON, *Primary Examiner.*

GEORGE D. MITCHELL, HERBERT L. MARTIN,
*Examiners.*